(No Model.)
S. UNNA.
APPARATUS FOR PRESERVING FRUIT.
No. 418,251. Patented Dec. 31, 1889.
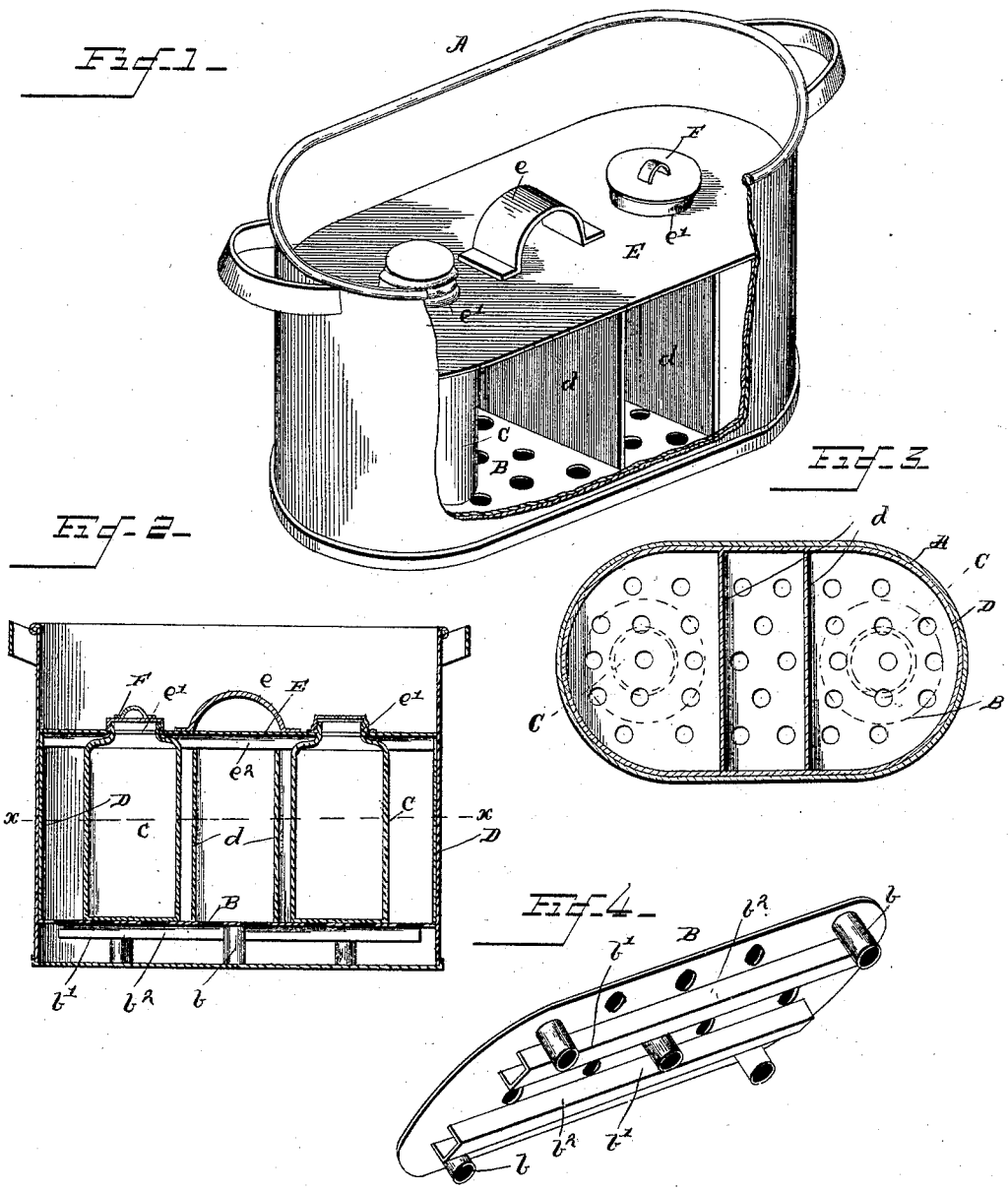
Witnesses
Geo. E. Frech.
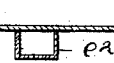
By her Attorneys,
Inventor
Serine Unna

UNITED STATES PATENT OFFICE.

SERINE UNNA, OF HASTINGS, NEBRASKA.

APPARATUS FOR PRESERVING FRUIT.

SPECIFICATION forming part of Letters Patent No. 418,251, dated December 31, 1889.

Application filed September 4, 1889. Serial No. 322,918. (No model.)

*To all whom it may concern:*

Be it known that I, SERINE UNNA, a citizen of the United States, residing at Hastings, in the county of Adams and State of Nebraska, have invented a new and useful Apparatus for Preserving Fruit, of which the following is a specification.

The invention relates to improvements in apparatus for preserving fruit.

The invention has for its object to provide an apparatus for preserving fruit of simple and inexpensive construction, which will save time, protect the jars from injury by heat, and prevent the water boiling into fruit.

The invention consists in the construction and novel combination and arrangement of parts, hereinafter fully described, illustrated in the accompanying drawings, and pointed out in the claims hereto appended.

In the drawings, Figure 1 is a perspective view of a preserving apparatus constructed in accordance with the invention, the boiler being broken away to show the disposition of the parts. Fig. 2 is a central vertical longitudinal sectional view. Fig. 3 is a horizontal longitudinal sectional view on line $x$ $x$ of Fig. 2. Fig. 4 is a detail view of the perforated false bottom. Fig. 5 is a central transverse sectional view of the cover.

Referring to the accompanying drawings, A designates a boiler of ordinary construction, which is provided with a perforated false bottom B, upon which rest the jars C, that contain the fruit to be preserved, whereby the jars C will be held away from the hot bottom of the boiler and the liability of cracking will be prevented.

The perforated false bottom B is supported on tubular legs $b$ and is strengthened by strips $b'$, arranged upon each side of its lower face and having upturned sides or flanges $b^2$, that are secured to the bottom B.

The jars C are supported within the boiler A by a frame D, constructed of sheet metal and conforming to the configuration of the sides of the boiler and fitting closely thereto, as do the bottom B and a cover E, and is provided with sheet-metal partitions $d$, which form a space at each end of the frame to receive the jars C.

The cover E has a central handle $e$ and a circular opening $e'$ at each end, through which openings $e'$ project the upper reduced ends of the jars, that are provided with loose tops F. By employing the cover E the water is prevented boiling over upon the tops of the jars C and getting to the fruit. The cover E is strengthened by strips $e^2$, constructed similarly to those already described.

When it is desired to remove the jars from the boiler or place them therein, the tops F are removed and screw-caps are employed, which are larger than the perforations $e'$ and enable the jars to be carried about with the cover E.

From the foregoing description and accompanying drawings the construction, operation, and advantages of the invention will readily be understood.

What I claim is—

1. In a preserving apparatus, the combination, with the boiler, the perforated false bottom, the supporting-frame, and the cover having openings to receive the upper ends of the jars and designed to carry the latter, substantially as described.

2. The combination of the boiler, the perforated false bottom having the legs $b$ and the strengthening-strips $b'$, the supporting-frame, and the cover resting upon the top of the supporting-frame and having openings to receive the jars, and provided with strengthening-strips and adapted to carry said jars, substantially as described.

3. The combination of the boiler, the perforated false bottom having tubular legs and strengthening-strips, the supporting-frame conforming to the configuration of the boiler and provided with partitions $d$, and the cover having openings to receive the jars and designed to carry the latter, substantially as described.

4. The boiler, in combination with the perforated false bottom, the supporting-frame adapted to rest on the bottom and provided with partitions, and a cover resting on the supporting-frame and adapted to carry the cans, as set forth.

5. In a preserving apparatus, the perforated false bottom B, the supporting-frame D, separate from the bottom and provided with interior partitions, and the cover E, separate from the frame D and supported on the top thereof and having the cans connected thereto and carried thereby, as set forth.

In testimony that I claim the foregoing as my own I have hereto affixed my signature in presence of two witnesses.

SERINE UNNA.

Witnesses:
C. B. HULTAN,
H. C. BOBZIEN.